United States Patent [19]

Padden

[11] Patent Number: 5,411,084

[45] Date of Patent: May 2, 1995

[54] SAND FILTER SYSTEM FOR USE IN A WELL

[75] Inventor: James B. Padden, Kernersville, N.C.

[73] Assignee: Purolator Products N.A., Inc., Tulsa, Okla.

[21] Appl. No.: 258,696

[22] Filed: Jun. 13, 1994

[51] Int. Cl.[6] .............................................. E21B 43/08
[52] U.S. Cl. .................................... 166/230; 166/231; 166/233; 210/357; 210/358
[58] Field of Search ...................... 166/227, 230, 233; 210/357, 358

[56] References Cited

U.S. PATENT DOCUMENTS

| | | | |
|---|---|---|---|
| 975,333 | 11/1910 | Decker | 166/233 |
| 1,040,342 | 10/1912 | Johnson | 166/233 |
| 1,367,406 | 2/1921 | McLean | |
| 1,992,718 | 2/1935 | Records | 166/5 |
| 2,035,313 | 3/1936 | Griffin | 166/230 |
| 2,046,459 | 7/1936 | Johnson | 166/233 |
| 2,081,190 | 5/1937 | Wilson | 166/233 |
| 2,342,913 | 2/1944 | Williams et al. | 166/5 |
| 2,858,894 | 11/1958 | Akeyson | 166/230 |
| 2,877,852 | 3/1959 | Bashara | 166/236 |
| 2,985,241 | 5/1961 | Hanslip | 166/230 |
| 3,327,865 | 6/1967 | Thompson | 210/497 |
| 3,712,373 | 1/1973 | Bearden et al. | 166/233 |
| 4,064,938 | 12/1977 | Fast | 166/236 |
| 4,317,023 | 2/1982 | Gryskiewicz | 219/121 |
| 4,388,968 | 6/1983 | Brandell | 166/236 |
| 4,406,326 | 9/1983 | Wagner | 166/227 |
| 4,428,431 | 1/1984 | Landry et al. | 166/298 |
| 4,494,603 | 1/1985 | Harguindey | 166/231 |
| 4,495,073 | 1/1985 | Beimgraben | 210/448 |
| 4,526,230 | 7/1985 | Kojicic | 166/236 |
| 4,649,996 | 3/1987 | Kojicic | 166/228 |
| 4,681,161 | 7/1987 | Arterbury et al. | 166/227 |
| 4,811,790 | 3/1989 | Jennings et al. | 166/278 |
| 4,821,800 | 4/1989 | Scott et al. | 166/228 |
| 5,004,049 | 4/1991 | Arterbury | 166/230 |
| 5,082,052 | 1/1992 | Jones et al. | 166/51 |
| 5,115,864 | 5/1992 | Gaidry et al. | 166/278 |
| 5,232,048 | 8/1993 | Whitebay et al. | 166/228 |
| 5,307,984 | 5/1994 | Nagaoka et al. | 166/233 X |
| 5,339,895 | 8/1994 | Arterbury et al. | 166/227 |
| 5,355,948 | 10/1994 | Sparlin et al. | 166/230 X |

Primary Examiner—Ramon S. Britts
Assistant Examiner—Frank S. Tsay
Attorney, Agent, or Firm—Head & Johnson

[57] ABSTRACT

A sand filter for use in a well is provided employing a length of perforated tubing. A tubular wedge wire screen is telescopically positioned on the tubing covering the perforations. A plurality of tubular corrugated filter elements are then positioned on the wedge wire screen in end-to-end relationship. Each of the filter elements is formed of diffusion bonded multiple layers of wire mesh and each of the filter elements is corrugated to provide an external surface having an area at least three times the area of the cylindrical external surface of the tubular wedge wire screen that is encompassed by each filter element. The corrugated filter elements are secured on the wedge wire screen and welded in abutted end-to-end position.

9 Claims, 5 Drawing Sheets

SAND FILTER SYSTEM FOR USE IN A WELL

CROSS-REFERENCE TO RELATED APPLICATIONS

This application is not related to an pending applications.

CROSS-REFERENCE TO MICROFICHE APPENDIX

This application is not related to any microfiche appendix.

BACKGROUND OF THE INVENTION

This invention relates to a sand filter for use in an oil and/or gas producing well. Oil and/or gas wells are drilled from the earth's surface, the well borehole penetrating into a subterranean hydrocarbon producing formation. Such formations are typically made up of porous rock. That is, oil and/or gas does not occur normally in the manner contemplated by the general public, that is, in pools of liquid or caverns filled with gas. Instead, hydrocarbons are typically found in a rock strata that has porosity and permeability sufficient that entrapped oil and/or gas can flow through the formation. As the porosity of a rock formation increases, the quantity of oil and/or gas in proportion to the mass of the rock can also increase. Further, as the permeability of a rock formation increases, the more freely oil and/or gas can flow from the formation.

Since porosity and permeability are inherent characteristics of most oil and/or gas producing formations, it is inevitable that sand components are typically carried along by the flowing hydrocarbon product.

When substantial quantities of sand are carried along as oil and/or gas is removed from a formation, the sand can eventually plug the openings into the interior of tubing by which the hydrocarbon production is withdrawn to the earth's surface.

When an oil producing well must be pumped, the entrance of sand into the fluid being pumped causes a high rate of pump wear. For these and other reasons, it is important to prevent as much sand as possible from entering into production tubing in a well and, for this purpose, sand filters have long been employed in the petroleum industry.

For information about sand filters and their application in oil or gas wells, see the following U.S. Pat. Nos. 1,367,406; 4,649,996; 1,992,718; 2,342,913; 2,985,241; 2,877,852; 2,858,894; 3,327,865; 4,064,938; 4,317,023; 4,388,968; 4,406,326; 4,428,431; 4,495,073; 4,494,603; 4,526,230; 4,649,996; 4,681,161; 4,811,790 and 4,821,800.

Some filtration systems include the use of packing material, and for reference to these type of filters see U.S. Pat. Nos. 5,082,052; 5,115,864 and 5,232,048.

Sand filters previously used in the petroleum industry have been deficient in several ways. In one way, many of the materials used for providing sand filtration do not possess the required ability to screen out small sand particles, that is, the screening materials let small diameter sand through that can ultimately cause blockage of flow paths or high pump wear. A second problem is that they have relatively small external surface areas so that sand builds up, blocking further flow. It is apparent that longer filter life can be achieved in direct relationship to the external surface area of the filter. Materials that have been used in previous type sand filters do not lend themselves to designing a sand filter in a way to increase the external surface area. A third problem is that many materials that are used for filtration are not capable of withstanding the harsh environment of a producing well. A fourth problem with some type filters is that they are expensive to manufacture and difficult to install.

Therefore, one object of the present invention is to provide an improved sand filtration system for use in oil and/or gas wells that provides improved filtration effectiveness. Another object is to provide a filter that has increased surface area per unit length. Another object is formed of materials capable of withstanding the riggers to which downhole sand filters are subjected and that can withstand the process of positioning them into the bottom of a borehole. In addition, this disclosure provides a sand filtration system that can be expeditiously applied to the exterior of a length of perforated tubing.

BRIEF SUMMARY OF THE INVENTION

A sand filter for use in an oil and/or gas producing well is provided. The filter employs a length of perforated tubing as the basic superstructure. A tubular wedge wire screen is positioned on the length of tubing covering the perforations therein. Thereafter, a plurality of tubular corrugated filter elements are telescopically positioned on the wedge wire screen in end-to-end relationship. Each of the filter elements is formed of bonded multiple layers of wire mesh. The wire mesh forming each filter element is corrugated to provide an external surface having an area at least three times the area of the cylindrical surface of the tubular wedge wire screen that is encompassed by each of the filter elements. The individual filter elements are received on the wedge wire screen in abutted end-to-end relationship and welded in position.

In a preferred embodiment, a short-length tubular spacer guide is positioned between and welded to adjacent filter elements. The spacer guides may have an external diameter at least equal to that of the corrugated filter elements so as to protect them as they are positioned into or retrieved from a well.

In another embodiment, individual cell contained filter elements are mounted on the exterior of a length of perforated tubing. Each of these elements includes an integral portion thereof, a length of tubular wedge wire screen having an internal diameter sized to telescopically receive the perforated tubing. A length of tubular corrugated filter material formed of wire mesh is telescopically received on the wedge wire screen. The tubular corrugated filter material is of length substantially that of the wedge wire screen. End caps are welded to the opposed ends of the wedge wire screen and corrugated tubular element to join these components into integral tubular elements that can then be slid onto a length of perforated tubing. When on the perforated tubing, the tubular elements may be welded in abutted end-to-end relationship. As above indicated, spacer guides may be positioned between the integral tubular elements.

A more complete understanding of the invention will be obtained from the following description of the preferred embodiments, taken in conjunction with the attached drawings.

DESCRIPTION OF THE DRAWINGS

FIG. 1 shows the upper and lower portions of the length of tubing that is perforated and the full length thereof, except the areas adjacent the top and bottom ends.

FIG. 2 shows the corrugations in the filter element.

FIG. 5 shows an alternate design for the end cap.

DESCRIPTION OF THE PREFERRED EMBODIMENTS

Figure 1:
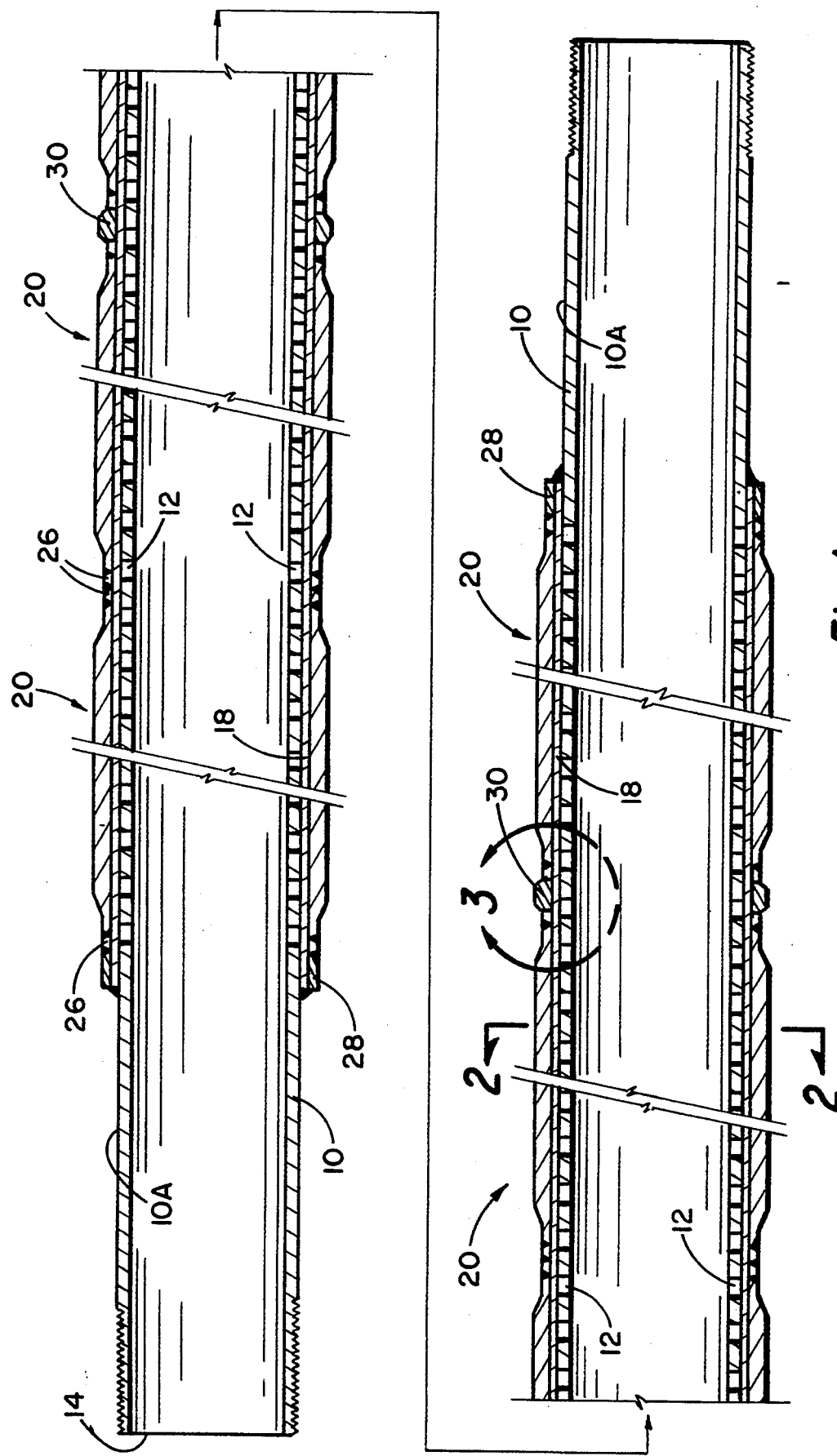
FIG. 1 is a cross-sectional view of a length of perforated tubing broken into sections, the perforated tubing having been adapted for use as a sand filter in a producing oil and/or gas well.

Referring to the drawings and first to FIGS. 1 through 5, a first embodiment of the invention is illustrated. FIG. 1 shows a length of tubing 10 broken into sections, the tubing being of the type and dimension commonly employed in completion of oil and/or gas producing wells. Tubing 10 is perforated, that is, it has perforations 12 drilled in the side wall. The perforations extend from near a threaded first end 14 to near a second end 16 of the tubing. Tubing 10 is typically 30 to 40 feet long and is one length of tubing in a string of tubing extending from the earth's surface. Perforated tubing 10 is normally positioned in a tubing string adjacent to or below a hydrocarbon bearing formation. Hydrocarbon liquids (crude oil) or gases pass from the formation (not shown) into a borehole (not shown) and enters tubing 10 through perforations 12. The fluid and/or gas is conveyed by the tubing string to the earth's surface. Where the formation pressure is sufficiently great, the fluid and/or gas will flow to the earth's surface. Where the formation pressure is not sufficient to overcome the gravitation effect of a column of fluid, the fluid can be pumped to the earth's surface. Whether the fluid and/or gas flows to the earth's surface or fluids are pumped to the earth's surface, it is important that the entry of sand from the producing formation into the interior of tubing 10 be minimized. For this purpose a sand filter is provided on the perforated tubing as illustrated in FIGS. 1 through 5.

Figure 3:
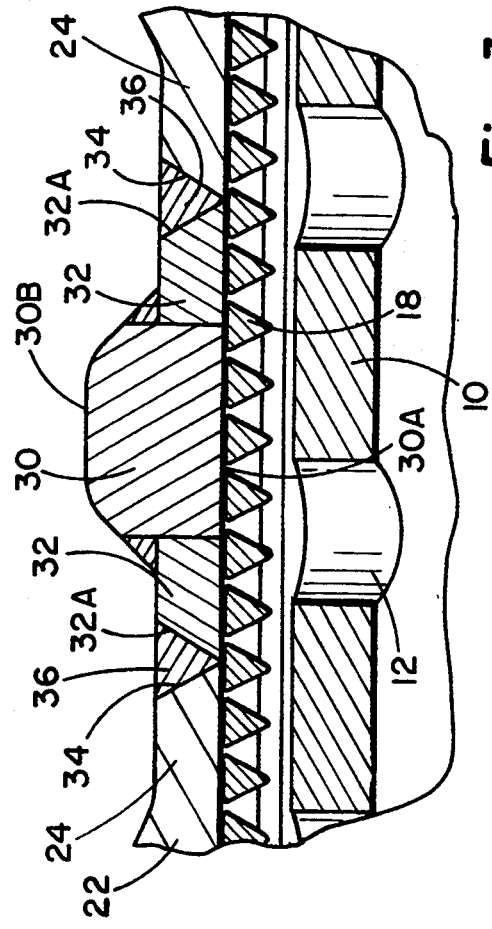
FIG. 3 is an enlarged fragmentary view taken from FIG. 1 showing a portion of the perforated tubing and the filtration elements and showing a spacer guide that is designed to position the filter elements in end-to-end relationship and, at the same time, to afford protection of the filter elements.

Positioned on the exterior surface 10A of tubing 10 in the area having perforations 12 is a tubular wedge wire screen 18. Wedge wire screen 18 may be formed as a tube and telescopically positioned on tubing 10 or it may be wrapped on the exterior of tubing 10. The wire of which wedge wire screen 18 is formed can be of various cross-sectional configurations. Wire commonly employed for forming wedge wire screen 18 has a triangular cross-sectional shape as illustrated in FIG. 3. Wedge wire screens can be formed that have sufficient strength to withstand the pressures to which sand filters employed in oil and/or gas wells are subjected to, however, they have a short coming in that if they are used as a primary sand control filter, the effective area is limited. For example, a wedge wire screen with 0.003 inch slot width (the spacing between adjacent wires) and a ribbon width (width of the wire) of 0.062 inches, the effective open area is only 4.6 percent. It can be seen that once this area is covered by sand particles, further flow through the filter is diminished and, thus, a sand filter having only a wedge wire screen 18 has a relatively short life. For this reason, additional screening material is employed that substantially adds to the useful life of the sand filter.

Figure 4:
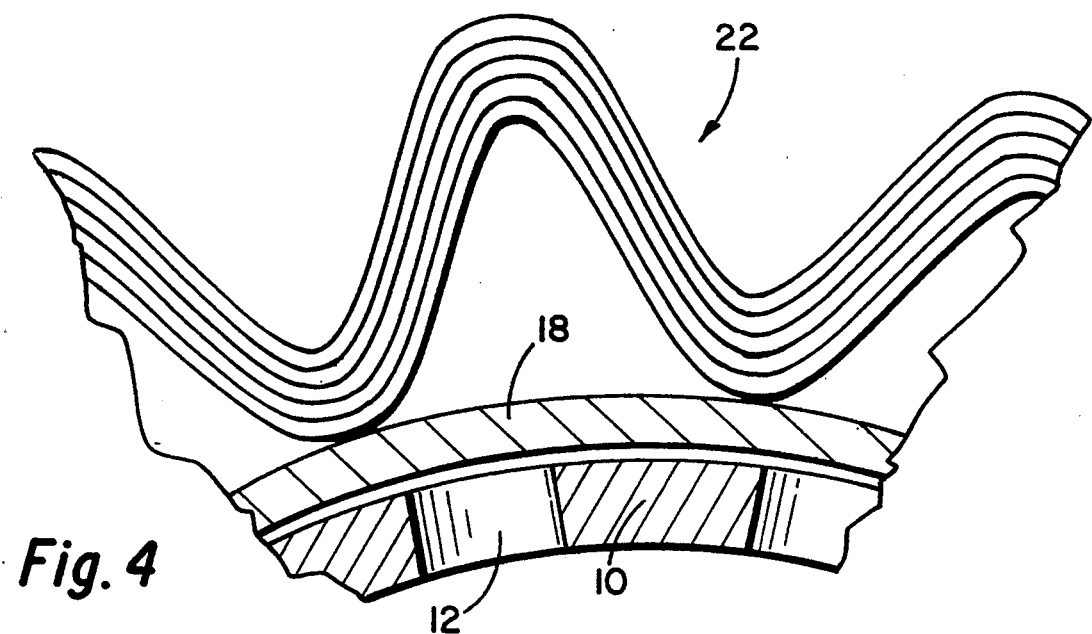
FIG. 4 is an enlarged fragmentary view taken from FIG. 2 showing the perforated tubing, the wedge wire screen positioned on the tubing and the tubular corrugated filter element formed of multiple layers of wire mesh diffusion bonded together to provide the complete sand filtration assembly.
Figure 2:
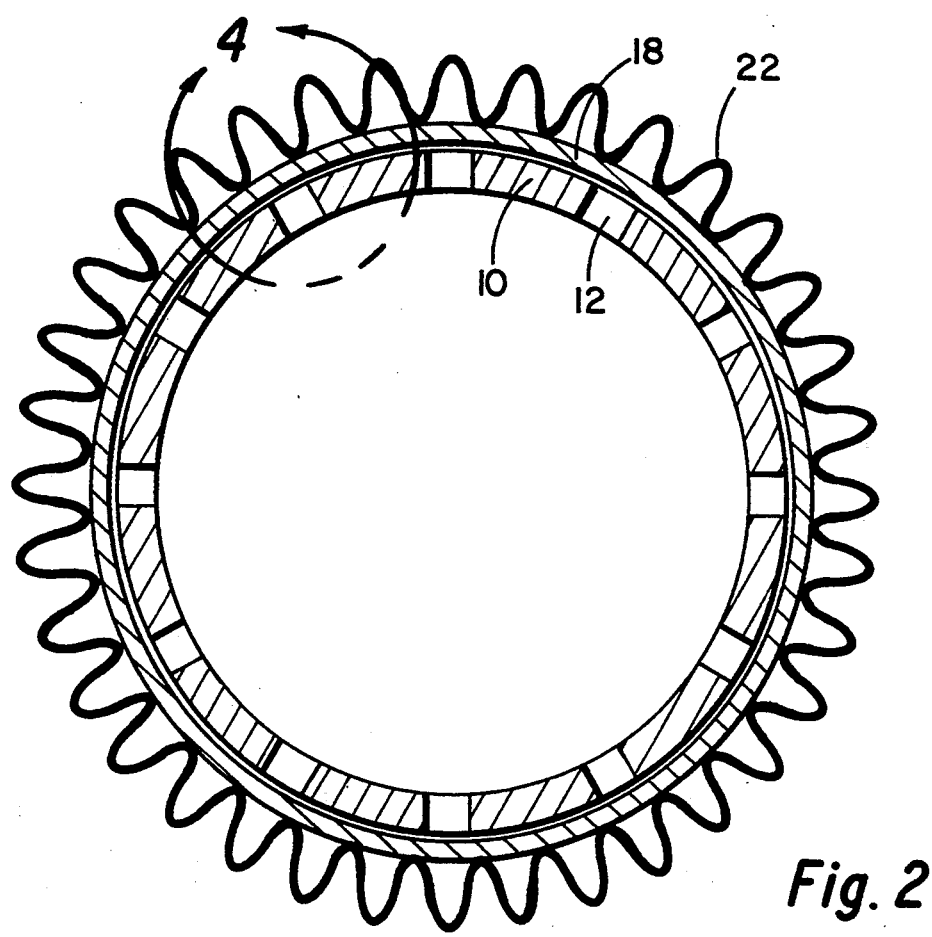
FIG. 2 is an enlarged cross-sectional view taken along the line 2—2 of FIG. 1 showing the perforated tubing as modified to form a sand filtration unit. Particularly.

Positioned on wedge wire screen 18 are preformed tubular corrugated filter elements, generally indicated by the numeral 20. Pleated tubular filter elements 20 may be of a length, such as four feet, so that thereby a plurality of such elements are employed to fully cover wedge wire screen 18 that covers the perforated portion of a length of tubing. Each of the pleated tubular filter elements includes, as shown in FIGS. 2 and 4, pleated diffusion bonded wire mesh 22. By "diffusion bonded wire mesh" is meant a wire mesh formed of multiple layers (five layers being indicated in FIG. 4) of woven wire that is diffusion bonded into an integral planar structure that is then pleated and formed into tubular elements. For examples of pleated diffusion bonded wire mesh of the type that is used for element 22, reference should be had to U.S. Pat. Nos. 5,076,875 and 5,145,729 both entitled "Composite Intermediate Bonding Structures". These two patents are incorporated herein by reference as they disclose methods of manufacturing multiple layer diffusion bonded wire material. The material results from a strong, permanent bond between multiple layers of wire mesh. The porosity of the wire mesh is determined by the screen size of each layer and the number of layers. Porosity of the bonded wedge wire screen is selected according to the size of sand to be intercepted by the filter.

Figure 5:
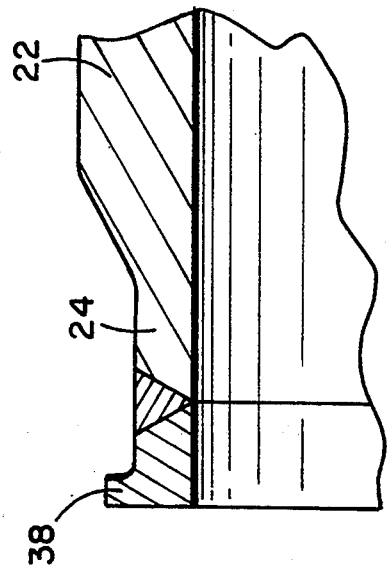
FIG. 5 is an enlarged fragmentary view of the end portion of a length of corrugated wire mesh filter element employed in the arrangement of FIG. 1.

An element 20 is formed by pleating a flat sheet of diffusion bonded wire mesh having a preselected length (such as four feet as previously mentioned) and a width so that when formed into a tube it is of internal diameter to telescopically fit over wedge wire screen 18 on tubing 10. The flat sheet of diffusion bonded wire mesh is rolled into a tube and welded to provide a unitary tubular member that is rolled to a reduced external diameter adjacent each end, as illustrated in FIGS. 1, 3 and 5. The reduced external diameter portion adjacent each end is indicated by numeral 24.

Pleated tubular filter elements 20 are positioned on wedge wire screen 18 and welded in end-to-end relationship using tubular short-length metal spacers 26. The end spacers 28 are tubular short-length members. These are welded to tubing 10 at the end of each series of elements 20. When wedge wire screen 18 and a plurality of pleated tubular elements 20 are assembled on a length of perforated tubing 10 and welded into position, the entire unit becomes an integral sand filter that can be positioned in an oil and/or gas well to permit oil and/or gas to flow from the exterior into the interior of the tubing while sand is trapped and retained on the exterior of the tubing.

Diffusion bonded wire mesh 22, of the type that can be effectively employed for forming the pleated tubular filter elements 20, is commercially available from Purolator Products Company of 8439 Triad Drive, Greensboro, N.C. and is sold under the registered trademark "POROPLATE".

When a tubing string is placed into or removed from an oil and/or gas well, it is possible to damage the pleated tubular filter elements 20. To reduce the possibility of damage, increased diameter spacer guides 30 may be employed, as illustrated in FIGS. 1 and 3. Each spacer guide 30 is a short-length tubular metallic element having an internal diameter 30A dimensioned so that it can be telescopically positioned on wedge wire screen 18. The external diameter 30B is that which is substantially equal to or slightly greater than the external diameter of pleated diffusion bonded wire mesh 22. Each spacer guide 30 is welded into position, as shown in FIG. 3, and functions to not only provide a spacer between adjacent lengths of pleated tubular filter elements 20 but serves to protect pleated diffusion bonded wire mesh 22 by providing a rigid surface to contact the interior of casing, or other portions of an oil and/or gas well, that may be encountered by the perforated tubing as it is positioned into or removed from a borehole.

As shown in FIG. 3, spacer guide 30 may be used in conjunction with tubular transitional spacers 32 that are welded at one end to spacer guide 30 as illustrated. One end 32A of each of the transitional spacers is beveled and, preferably, the ends of the reduced external diameter portion 24 of each length of tubular wire mesh 22 are beveled at 34 to more effectively receive a weld 36 so as to integrally bond the elements together.

FIG. 5 shows a slightly alternate arrangement compared to FIG. 1 in which a structured end cap 38 is employed. The end cap has an integral radially enlarged diameter portion to help protect pleated wire mesh 22 and is welded in position, as indicated in FIG. 5. End cap 38 replaces end spacers 28 as shown in FIG. 1.

Figure 6:
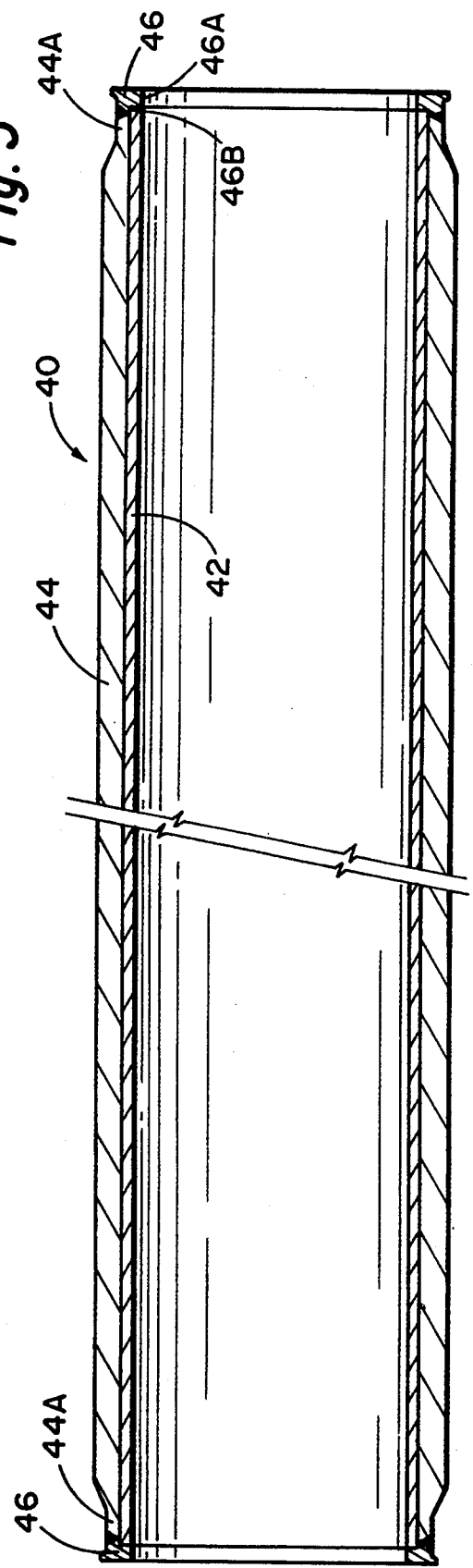
FIG. 6 is an alternate embodiment of the invention. This cross-sectional view shows a partially cut-away sand filtration element that can be telescopically positioned on the perforated portion on a length of tubing, The element of FIG. 6 is self-contained, A plurality of such elements can be fitted on a length of perforated tubing and welded in abutted end-to-end relationship to complete a sand filter assembly.

FIG. 6 shows an alternate embodiment of the invention. FIG. 6 includes essentially the same components as described with reference to FIGS. 1 through 5, however, the assembly is in a different way. In the embodiment of FIG. 6, short lengths of filter elements, generally indicated by the numeral 40, are assembled directly onto the perforated portion of a length of tubing. That is, in the embodiment of FIG. 6 the tubular filter elements are integral. This is accomplished by employing a short length (such as four feet as an example) of wedge wire screen 42 that may be of the same material as wedge wire screen 18, and a short length of pleated diffusion bonded wire mesh 44 that is preferably the same material as pleated diffusion bonded wire mesh 22 previously described. Elements 42 and 44 are joined in an assembly. To complete the assembly, an end ring 46 is welded to each end. As illustrated in FIG. 6, end ring 46 has a first internal diameter portion 46A that is substantially equal to the internal diameter of wedge wire screen 42 and also is of internal diameter slightly larger than the external diameter of the tubing on which the element is to be employed. End ring 46 has a second internal diameter portion 46B that is larger, that is, of an internal diameter equal to the external diameter of wedge wire screen 42 so that the ring abuts against the end of the wedge wire screen and encompasses a short length of the wedge wire screen adjacent each end. Tubular diffusion bonded wire mesh 44 has a reduced diameter portion 44A at each end that is welded to end ring 46. After the end rings are welded in position, as illustrated in FIG. 6, filter element 40 is complete. Elements 40 may be inserted telescopically onto the exterior of the length of perforated tubing. When in position on the tubing, adjacent end rings 46 may be welded to each other or spacers of the type indicated by the numeral 26 in FIG. 1, or spacer guides 30 as illustrated in FIG. 3, may be positioned between adjacent end rings and welded into position.

Whether the embodiment of FIGS. 1 through 5 or the embodiment of FIG. 6 is employed, the filtration system remains essentially the same—the difference is in the method of installation. The embodiment of FIG. 6 provides a device that is completely fabricated in a shop so that the elements may be assembled onto a length of perforated tubing and welded into position in the field. In this arrangement, the shop that produces the tubular filter elements 40 of FIG. 6 does not have to accommodate long lengths of perforated tubing, whereas the embodiment of FIGS. 1 through 5 requires manufacturing facilities, either in the shop or in the field, where the tubing and filtration system are combined into an integral unit.

As previously indicated, a typical wedge wire screen 18 that can be used for filtration purposes has a rather low percentage (4.6 percent in the example given above) of open area. By use of pleated, multiple layer diffusion bonded wire mesh 22, the surface area will be three to five times greater than the cylindrical area of wedge wire screen 18. The open area of the diffusion bonded screen can be as much as 20 to 30 times greater than that of wedge wire screen 18.

Multi-layer diffusion bonded wire mesh 22 can be formed of a five-layer sandwich of mesh with the two outer layers such as 20×20 or 30×30, with the two inner layers as 100×100 mesh, and with the center layer of 200×200 mesh to provide a filtration media that will intercept a sand particle size of 0.003 inch. The pore size can be selected according to engineering requirements, with the pore size being sufficient to retain sand but to pass silt or other solid materials that are of insufficient size to cause operating problems in an oil and/or gas well.

The sand filter system for use in a well has been illustrated and described in which a wedge wire screen 18 is employed. This is the preferred embodiment as a wedge wire screen has the advantageous previously discussed. However, the invention can be practiced utilizing a course, woven wire screen in place of the wedge wire screen.

Figure 7:
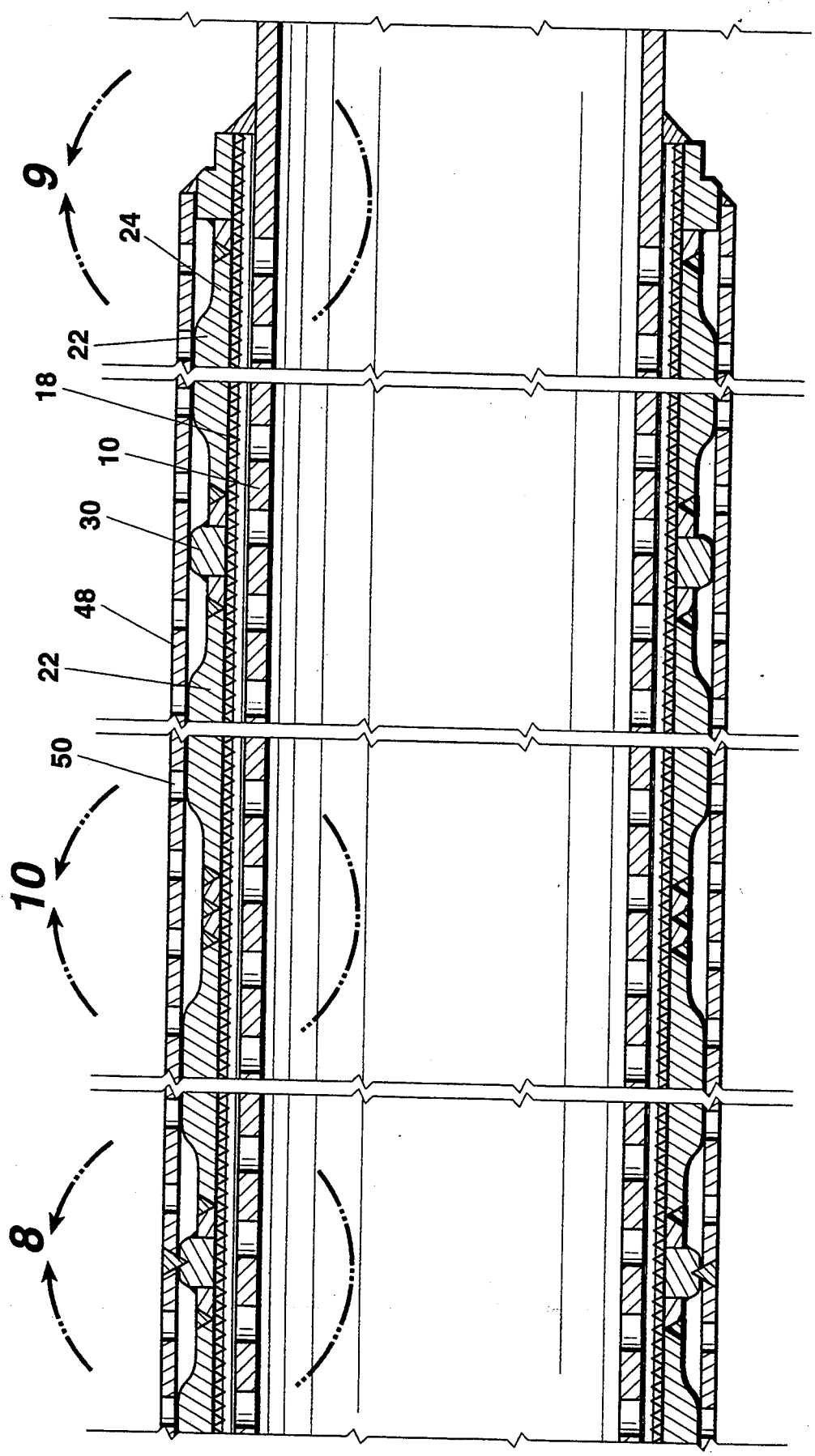
FIG. 7 is an enlarged fragmentary cross-sectional view of a portion of a length of perforated tubing broken into sections that is an alternate embodiment of the invention, The alternate embodiment of FIG. 7 is substantially the same as that shown in FIGS. 1–6 except for the inclusion of a tubular perforated wrapper positioned exteriorly of the corrugated filter element.
Figure 8:
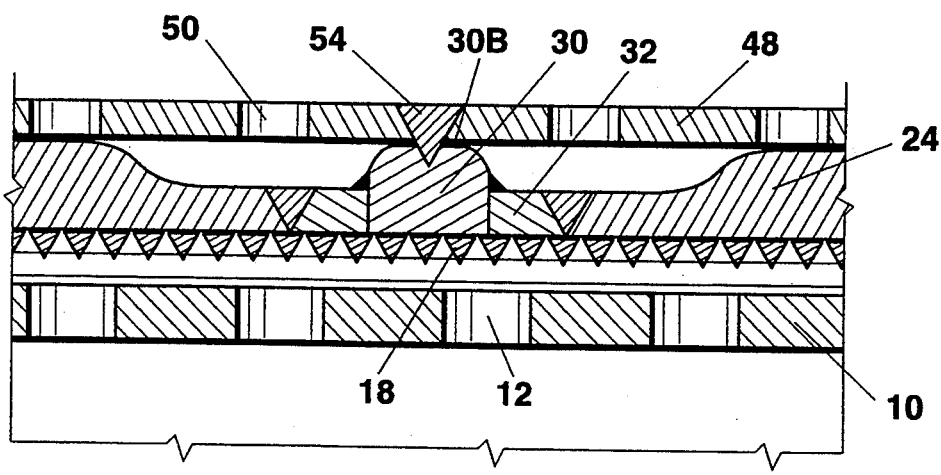
FIG. 8 is an enlarged fragmentary cross-sectional view taken from FIG. 7 showing the arrangement of the components making up the sand filter system at a point of juncture of filter elements using an increased diameter spacer guide and showing how lengths of perforated wrapper may be joined at a spacer guide.
Figure 9:
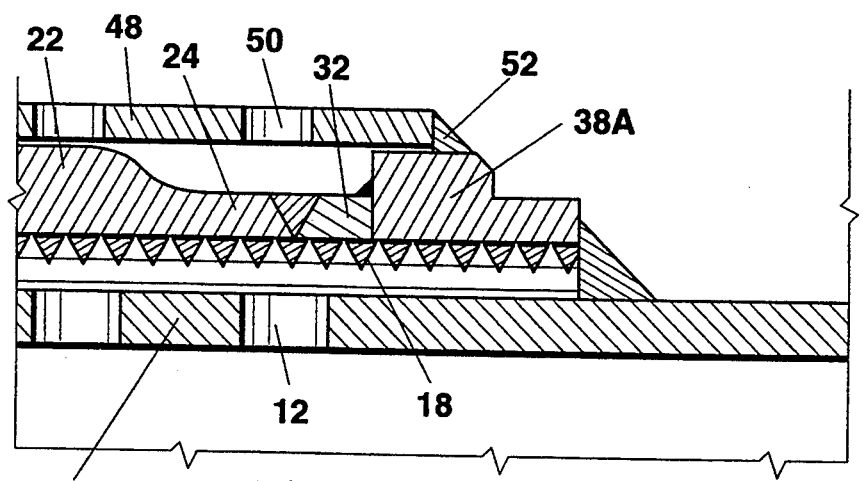
FIG. 9 is an enlarged fragmentary view taken from FIG. 7 showing the terminal end portion of the alternate embodiment of the invention.
Figure 10:
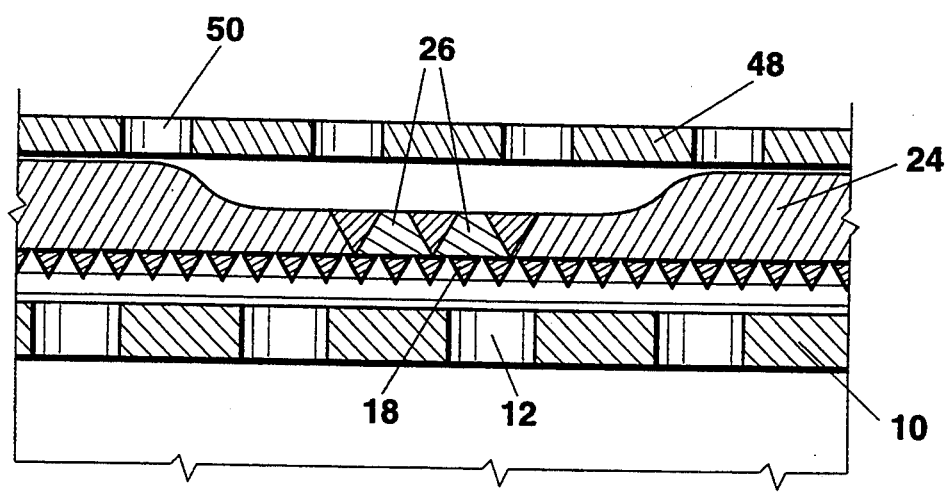
FIG. 10 is an enlarged fragmentary view taken from FIG. 7 showing one means of abutting lengths of tubular corrugated filter and showing how the wrapper is employed.

FIGS. 7, 8, 9 and 10 show an alternate embodiment of the invention wherein a wrapper 48 is applied to the exterior of the assembly. Wrapper 48 is a perforated tubular member, that is, a tubular member having perforations 50. Wrapper 48 is positioned and welded into place over the assembly of the welded wedge wire screen 18 and pleated diffusion bonded wire mesh 22 on the exterior of perforated tubing 10. Wrapper 48 may be formed of an integral metal tubular element that is provided with perforation 50 or it may be formed of a flat sheet of perforated metal that is rolled into a tubular element and the seam welded to form tubular member. Wrapper 50 is affixed to the assembly by welding as illustrated in FIGS. 7, 8, and 9. Wrapper 48 may be employed in lengths that are greater than the pleated diffusion bonded wire mesh 22 elements. Wrapper elements 48 may be employed in lengths that are greater than the length of pleated diffusion bonded elements 22. That is, wrapper elements 48 do not have to be welded at each location where the pleated diffusion bonded wire mesh elements are welded. This is illustrated in FIG. 10.

Wrapper 50 intercepts larger solid contaminant particles but the primary function of wrapper 50 is to protect pleated diffusion bonded wire mesh 22. Protection is particularly important as the sand filter is being assembled for insertion into an oil or gas well and during the insertion process.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A sand filter for use in a well comprising:
    a length of tubing having opposed ends and a portion intermediate the opposed ends that is perforated;
    a tubular wedge wire screen received on and secured to said tubing and covering at least a portion of said perforated portion and having an external cylindrical surface; and
    a plurality of tubular corrugated filter elements received on and secured to said tubular wedge wire screen in end-to-end relationship, each filter element being formed of diffusion bonded multiple layers of wire mesh, each filter element being corrugated to provide an external surface having an area at least three times the area of said cylindrical external surface of said tubular wedge wire screen that is encompassed by each filter element, said corrugated filter elements having an external diameter, said filter elements being received on said tubular wedge wire screen in abutted, end-to-end relationship.

2. A sand filter according to claim 1 including:
    short-length tubular metal spacers each of internal diameter slightly larger than said tubular wedge wire screen external diameter and being telescopically received on said tubular wedge wire screen between adjacent said corrugated filter elements, said filter elements being welded to said spacers.

3. A sand filter according to claim 2 wherein at least some of said spacers are spacer guides that have an external diameter at least as great as said external diameter of said corrugated filter elements whereby said spacer guides serve to protect said corrugated filter elements.

4. A sand filter for mounting on the exterior of a length of perforated tubing, comprising:
    a length of tubular wedge wire screen having an internal diameter sized to telescopically receive perforated tubing, the tubular wedge wire screen having opposed ends, and an external diameter;
    a length of tubular corrugated filter element formed of wire mesh and telescopically received on said wedge wire screen and having opposed ends, the length of said filter element being substantially the length of said wedge wire screen; and
    first and second tubular end caps each having an internal diameter sized to telescopically receive the perforated tubing, an end cap being welded to each said end of said filter element and configured to retain said length of wedge wire screen therebetween, said wedge wire screen, said filter element and said end caps unitarily forming said sand filter, a plurality of which may be mounted in end-to-end relationship on perforated tubing to provide sand filtration.

5. A sand filter according to claim 4 wherein said corrugated filter material is configured to provide an external surface having an area at least three times the external surface area of said tubular wedge wire screen that said corrugated filter material encompasses.

6. A sand filter according to claim 4 wherein said length of tubular corrugated filter material is formed of diffusion bonded multiple layers of wire mesh.

7. A sand filter according to claim 1 including:
    a tubular perforated protective wrapper received on and encompassing at least some of said corrugated filter elements.

8. A sand filter according to claim 7 wherein said tubular perforated protective wrapper is of a length equal to substantially a multiple of the length of a said tubular corrugated filter elements whereby a single tubular perforated protective wrapper may encompass at least two of said tubular corrugated filter elements.

9. A sand filter according to claim 3 including:
    a tubular perforated protective wrapper received on and encompassing at least some of said corrugated filter elements, the protective wrapper having an internal diameter permitting to be telescopically positioned on and welded to at least some of said spacer guides.

* * * * *